Sept. 8, 1953 E. TOTH 2,651,761

VARIABLE BAND-WIDTH TRANSFORMER

Filed Aug. 5, 1948

INVENTOR.
EMERICK TOTH

BY M. A. Hayes

ATTORNEY

Patented Sept. 8, 1953 2,651,761

UNITED STATES PATENT OFFICE 2,651,761

VARIABLE BAND-WIDTH TRANSFORMER

Emerick Toth, Takoma Park, Md.

Application August 5, 1948, Serial No. 42,661

3 Claims. (Cl. 333—77)

(Granted under Title 35, U. S. Code (1952), sec. 266)

This invention relates generally to means for varying the coupling between high frequency tuned circuits, and more particularly to variable bandwidth transformers.

In communication receivers, means for varying the bandwidth of the intermediate frequency stages is often provided. A narrow bandwidth is desired for greater selectivity in congested frequency bands and is particularly desirable for reception of dots and dashes of continuous waves or C. W. A relatively broader bandwidth provides improved fidelity of modulated carrier wave or M. C. W. signals and facilitates tuning. After the desired station has been selected using a broad bandwidth in the I. F. stages, the bandwidth may be narrowed to eliminate interfering stations.

In present day receivers operating in the medium high frequency ranges the intermediate frequency is generally on the order of 455 kc. and the normal bandwidth is 5 to 10 kc. At these frequencies it has been found satisfactory to change the bandwidth by manually switching additional components in and out of the tuned I. F. circuits. This system requires additional components for each degree of bandwidth provided and, because of the switch wiring and component parts, regeneration difficulties and distributed capacitance and inductance render it unsatisfactory at higher frequencies.

In varying the bandwidth of an I. F. transformer it is usually essential to maintain the same center frequency, otherwise varying the bandwidth will tend to misalign the receiver. The relative breadth of the resonance curve of a two-resonant-circuit depends primarily upon the coefficient of coupling: close coupling between the primary and secondary coils produces a wider response curve and loose coupling a narrower response. For inductive coupling, the coefficient of coupling K can be defined as:

$$K=\frac{M}{\sqrt{L_1L_2}}$$

where $L_1$ and $L_2$ are respectively the self-inductances of the primary and secondary windings and M is the mutual inductance therebetween.

The center frequency of the transformer will remain unchanged for coupling variations provided the primary and secondary circuits are coupled by flux-linkage and retain the same resonant frequency and essentially the same Q. It appears then that to vary the bandwidth and retain the same center frequency, the coupling K should be varied by varying the flux linkage and the self-inductances $L_1$ and $L_2$ should not be altered.

This has been done with a moderate shift of center frequency at the lower radio-frequencies by varying the proximity of one transformer winding with respect to the other. However, recent communication equipment design requires a center frequency of the order of 15 mc. that will be shifted less than .1% over a bandwidth variation of 2 to 1. Prior art methods cause a considerably larger shift even at lower radio-frequencies, and at these higher frequencies the variation in circuit capacitance and inductance produced by the prior art methods of moving one of the transformer windings varies the resonant frequency of both circuits excessively due to stray coupling and proximity effect variations. It would at first glance seem that the center frequency would not change since the self-inductance of the respective windings apparently has not been changed. But the proximity effect, i. e., the appearance of the metallic masses of one winding in the field of the other is large enough with respect to the lumped values at these frequencies that any variation therein will materially affect the resonant frequency of both windings.

Placing the coil of a tuned circuit within a shield changes both its inductance and its Q. Both of these are factors which should remain substantially unchanged to preserve the same center frequency and side-slopes of the selectivity curve for a change in coupling. Moving the coil with respect to the shield will produce a variation in the effect of the shield upon the circuit inductance and resonant frequency. Therefore, variation in coupling accomplished by moving a coil with respect to another can cause an even greater shift in center frequency in the case of shielded coils. This is particularly unfortunate because shielding of interstage transformers becomes of great importance in multistage receivers.

It is therefore an object of this invention to provide a simple means for continuously varying the bandwidth of a receiver without varying the frequency to which the receiver is tuned.

It is another object of this invention to provide a 2–1 bandwidth variation of a high frequency tuned circuit without varying the center frequency more than .1%.

It is another object of this invention to vary the position of one winding of a high frequency coupling transformer with respect to another winding without materially changing the proximity effect.

It is another object of this invention to vary the position of one winding of a shielded high frequency coupling transformer with respect to another winding without materially changing the inductance of the first winding due to variation in position within the shield.

Other objects and features of this invention will be apparent from the following description and accompanying drawings, wherein similar characters of reference are used throughout the several views, and in which.

Briefly, this invention varies the coupling between two tuned circuits located within a common shield by rotating the inductance winding in one circuit about a transverse axis lying in the plane of the central turn of said winding. Consequently the metallic mass of the rotatable winding remains symmetrical with respect to the shield and the other winding in any position to which it may be rotated.

Figure 1:
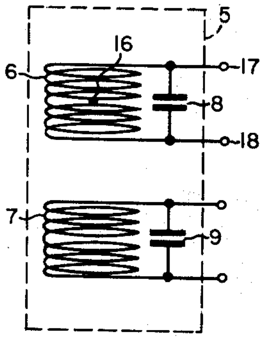
Fig. 1 and Fig. 2 are schematic diagrams showing the principle of this invention.

Referring now to Fig. 1 in detail, a schematic diagram of a variable bandwidth transformer is shown. It will be noted that the tuned circuits are entirely included within the transformer shield 5. The primary coil 6 and the secondary coil 7 are of substantially the same physical dimensions so as to present the same self-inductance and their common longitudinal axis is symmetrically disposed within the walls of the shield 5. Each is shunted by a condenser, 8 and 9, to provide resonant circuits.

Coupling between the two tuned circuits is provided principally by linkage of the fields of coils 6 and 7. A small amount of additional coupling is provided by stray capacitance. Therefore the band pass of the circuits may be controlled by varying the amount of coupling between coils 6 and 7, such as by varying the spatial relation of said coils. One of the coils, for example coil 6, is rotatable about a central transverse axis 16. Since coil 6 is symmetrically disposed with respect to the shield and is rotated about a central axis, its physical and electrical position with respect to the shield 5 and the other coil 7 remains symmetrical. In order to segregate the wiring carrying the tank currents it was found advisable to rotate condenser 8 with coil 6 and make connection to the transformer terminals 17 and 18 through sliding contacts to avoid pigtails or other varying inductance elements. These contacts are shown in detail in Figs. 3 and 4. In accordance with good transformer practice, the transformer of this invention should be tied into the receiver circuit so that the high potential ends of the respective coils are the furthest apart. This will minimize capacitative coupling and also variation in capacitative coupling due to variation in the coil positions.

Figure 2:
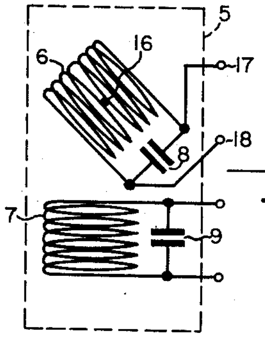

Fig. 2 shows the physical arrangement of the circuit components of Fig. 1 after the coil 6 has been rotated a part of a turn about axis 16. With the coils 6 and 7 in the position shown in Fig. 2, less linkage of their respective fields will occur than when in the position shown in Fig. 1. The coupling between coils 6 and 7 is less for Fig. 2 than for Fig. 1 but it will be seen that the metallic mass of coil 6 has the same net physical relation with respect to coil 7 and shield 5 in either position since it is rotated about an axis taken transversely through its center. Thus rotation of coil 6 about axis 16 changes the transformer coupling without changing the proximity effects. As the linkage of the moving coil to the fixed coil decreases, the linkage between moving coil and shield tends to increase somewhat, thereby introducing a compensating effect on the moving coil inductance. The fixed coil, however, has some of its flux linked to the copper of the moving coil to essentially the same degree at all times, so that the proximity or eddy-current effect remains substantially constant and the fixed coil inductance is unchanged.

Figure 3:
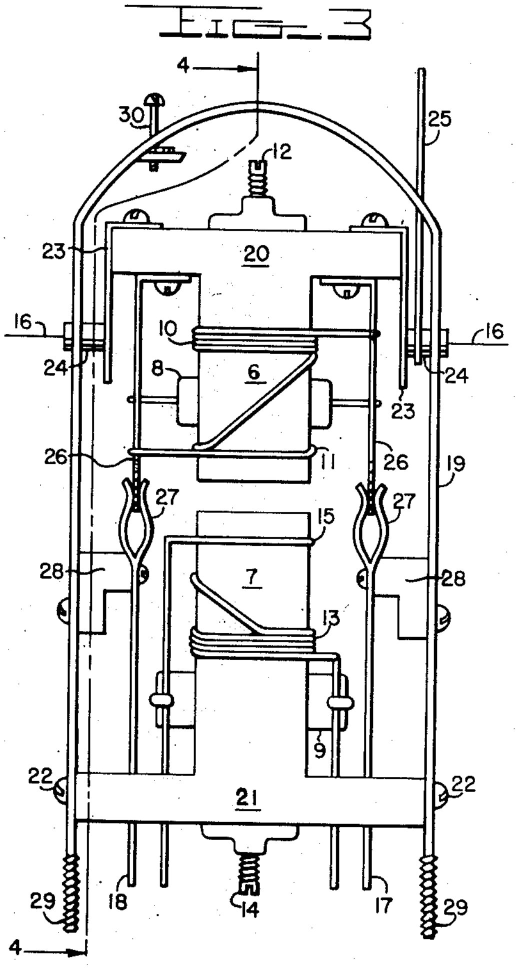
Fig. 3 is a side elevational view of a preferred embodiment of this invention.

Fig. 3 is an elevation view of a preferred embodiment of this invention shown with the shield can 5 removed. In this embodiment the coils are wound on half inch forms and tuned with 200 mmfd. capacitors to provide a bandwidth variation from 125 kc. to 250 kc. at a center frequency of 15.1 mc. With this embodiment the center frequency will be shifted less than .07% on the entire bandwidth variation. The coils are assembled in a metal yoke 19 which snugly fits the shield can 5 (not shown).

It will be noted in the embodiment of Fig. 3 that each of the coils 6 and 7 are composed of two groups of windings. In coil 6 the upper group of windings 10 comprises nearly all of the inductance of coil 6 but a compensating link 11 is wound in series with the group of windings 10 and disposed much closer to the other coil 7. A magnetic tuning slug 12 operates in the region of the larger group of winding 10 so that adjustments of slug 12 vary the inductance of windings 10 but not of the compensating link 11. Coil 7 is similarly arranged with a principal group of windings 13, a tuning slug 14 operable in the region of said windings, and a series compensating link 15 disposed closer to coil 6 and out of the region of the slug 14. The tuning slugs are provided for varying the transformer center frequency and are used in aligning the receiver stages in which these transformers are employed. The compensating links 11 and 15 are added in conjunction with the tuning slugs to prevent adjustments of the center frequency from changing the net coupling coefficient in such manner as to affect the bandwidth.

Coupling between coils 6 and 7 is provided principally by their respective larger groups of windings 10 and 13. The mutual inductance between these coils does not vary linearly with changes in their self inductance as produced by adjustment of slugs 12 and 14. This would produce a change in bandwidth due to the change in coupling except for the compensating links 11 and 15. These links provide a small but constant amount of mutual inductance which does not substantially increase with increases in the self-inductance of the larger groups of windings and has been found to provide the desired overall mutual inductance-self-inductance relationship of the transformer.

The forms for the respective coils 6 and 7 may be molded integrally with base members 20 and 21 of non-conducting material. The base member 21 of lower coil 7 may be attached directly to the yoke 19 as by screws 22. But the upper coil, since it is to be pivotable, is preferably supported between a pair of small angle brackets 23. Each of the angle brackets perpendicularly supports an axle member 24 which rotatably mount in yoke 19. The axis of the axle members 24 is coincident with the axis 16 of the group of coil windings 10. A lever arm 25 is mounted on one of said axle members 24. Slots are provided in yoke 19 and shield can 5 through which lever arm 25 may protrude, thereby enabling rotation of coil 6 from outside the shield can.

Condenser 8 and the windings of coil 6 are connected in parallel to a pair of metal U-shaped members 26 supported perpendicularly from insulating base member 20. As will be more clearly understood from Fig. 4, these U-shaped members provide the sliding contact means for movable coil 6. Each U-shaped member slidably engages a contact member 27 which is respectively connected to output terminals 17 and 18. Each of the contact members 27 is supported by an insulated block 28 mounted on yoke 19. Since the condenser 8 rotates with coil 6 only the tank currents which charge tube and stray capacitances pass through the sliding contacts. Receiver noise is then minimized by keeping the current in the sliding contacts small, it may be further reduced by using two or more sliding contacts on each yoke. In the embodiment of Fig. 3, the yoke 19 carries bolts 29 for affixing the transformer to a radio chassis. The shield can may be secured to the yoke by means such as screw 30.

Figure 4:
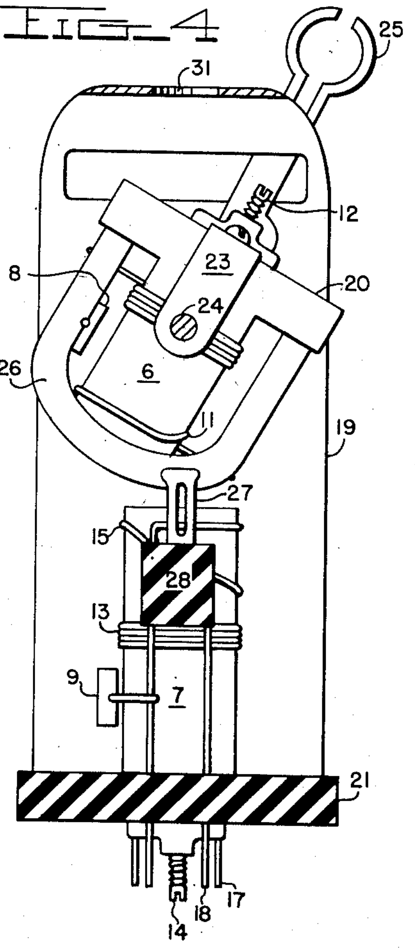
Fig. 4 is a cutaway view taken along the lines 4—4 of Fig. 3.

Fig. 4 shows another side view of the embodiment of Fig. 3. This view is taken from the yoke side of the transformer, in order to show the interior of the transformer the yoke has been cut away on the near side. Fig. 4 is taken along lines 4—4 of Fig. 3. The engagement of the U-shaped member 26 with the contact member 27 for any position of coil 6 may easily be seen in Fig. 4. In this figure the coil 6 has been rotated to show the spatial relation of the coils for loose coupling as described in connection with Fig. 2. The compensating links 11 and 15 constitute such a small portion of the coil inductances and have such a small metallic mass that their unsymmetrical movement does not materially alter the proximity effect between the coils. A hole 31 is provided in the top of yoke 19 to facilitate tuning the slug 12. Coil 6 should be rotated to a vertical position before tuning so that slug 12 will be directly beneath the hole 31. A corresponding hole should also be provided in the shield can 5 (not shown) so that tuning can be accomplished with the shield in place. If desired, however, suitable holes may be provided to permit tuning with coil 6 displaced off the vertical or longitudinal axis.

The lever arm 25 is preferably slotted as shown in Fig. 3 to permit its detachable engagement with a mechanical tuning means which may be operated from the front panel of the receiver. It will be obvious that the bandwidth of a plurality of I. F. stages can be simultaneously controlled by providing each with the transformer of this invention and driving the lever arm 25 of each in gang from a common turning mechanism.

Fig. 4 shows the upper end of coil 6 connected to the left arm of its U-shaped member 26 while the lower end of said coil is connected to the right arm of its respective U member. With this arrangement, when coil 6 is rotated the conductive path from contacts 27 to one end of the coil becomes longer while the path to the other becomes correspondingly shorter, thus avoiding an inductance variation due to variation in length of the leads.

Although only a certain and specific embodiment of this invention has been herein disclosed and described, it is to be understood that it is merely illustrative of this invention and modifications may, of course be made without departing from the spirit and scope of the invention as defined in the appended claims.

The invention described herein may be manufactured and used by or for the Government of the United States of America for governmental purposes without the payment of any royalties thereon or therefor.

What is claimed is:

1. A variable bandwidth radio frequency transformer comprising, a pair of coils tuned to the same frequency and normally disposed end to end in collinear relation so as to have a common longitudinal axis, each of said coils being disposed within the flux path of the other to provide the transformer coupling, an electrostatic shield surrounding said coils and having a longitudinal axis coincident with that of the coils, one of said coils being pivotable about a tansverse axis lying in the plane of the center winding thereof, a pair of U-shaped conductive members positioned on either side of said pivotable coil and parallel to the longitudinal axis thereof, one end of said pivotable coil being connected to one U-shaped member and the other end being connected to the other U-shaped member, a pair of sliding contact means each adapted to contact one of said U-shaped members in any position thereof, and means for pivoting said pivotable coil and said U-shaped members from outside said electrostatic shield.

2. A variable bandwidth radio frequency transformer comprising, first and second coils of substantially equal inductance and normally disposed end to end in collinear relation so as to have a common longitudinal axis, each of said coils being disposed within the flux path of the other to provide the transformer coupling, a pair of U-shaped conducting members positioned on either side of said first coil and parallel to the longitudinal axis of said coil, first and second condensers respectively connected in parallel with said first and second coils to provide a pair of tuned circuits resonant at the same frequency, one end of said first coil being connected to one U-shaped member and the other end of said first coil being connected to the other U-shaped member, an electrostatic shield surrounding said coils and condensers and having a longitudinal axis coincident with that of the coils, said first coil and first condenser and both U-shaped members being pivotable about a transverse axis lying in the plane of the center winding of said first coil, a pair of sliding contact means each adapted to contact one of said U-shaped members in any position thereof, and means for pivoting said pivotable combination from outside said electrostatic shield.

3. A variable bandwidth radio frequency transformer comprising, first and second coils of substantially equal inductance and normally disposed end to end in collinear relation so as to have a common longitudinal axis, each of said coils being disposed within the flux path of the other to provide the transformer coupling, a pair of U-shaped conducing members positioned on either side of said first coil and parallel to the longitudinal axis of said coil, first and second condensers respectively connected in parallel with said first and second coils to provide a pair of tuned circuits resonant at the same frequency, one end of said first coil being connected to one arm of one U-shaped member and the other end of said first coil being connected to the opposite arm of the other U-shaped member, an electrostatic shield surrounding said coils and condensers and having a longitudinal axis coincident with that of the coils, said first coil and first condenser and both U-shaped members being pivotable about a transverse axis lying in the plane of the center winding of said first coil, a pair of sliding contact means each adapted to contact a respective one of said U-shaped members for any position thereof, and means for pivoting said pivotable combination from outside said electrostatic shield.

EMERICK TOTH.

References Cited in the file of this patent

UNITED STATES PATENTS

| Number | Name | Date |
|---|---|---|
| 390,820 | Tesla | Oct. 9, 1888 |
| 1,631,380 | Miller | June 7, 1927 |
| 1,911,253 | Washington | May 30, 1933 |
| 2,028,534 | Crossley | Jan. 21, 1936 |
| 2,066,777 | Harnett | Jan. 5, 1937 |
| 2,082,589 | Neighbors et al. | Oct. 9, 1937 |